United States Patent
Inoue et al.

(10) Patent No.: US 10,678,081 B2
(45) Date of Patent: Jun. 9, 2020

(54) COVER GLASS AND DISPLAY DEVICE

(71) Applicant: AGC INC., Chiyoda-ku (JP)

(72) Inventors: Atsushi Inoue, Tokyo (JP); Yasuhiro Inoue, Tokyo (JP); Takeaki Ono, Tokyo (JP); Kyohei Hashimoto, Tokyo (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 16/202,947

(22) Filed: Nov. 28, 2018

(65) Prior Publication Data

US 2019/0094604 A1 Mar. 28, 2019

Related U.S. Application Data

(63) Continuation of application No. PCT/JP2017/019708, filed on May 26, 2017.

(30) Foreign Application Priority Data

May 31, 2016 (JP) .................. 2016-108748

(51) Int. Cl.
*G02F 1/1333* (2006.01)
*G09F 9/00* (2006.01)
(Continued)

(52) U.S. Cl.
CPC ........ *G02F 1/133308* (2013.01); *C03C 19/00* (2013.01); *C03C 21/00* (2013.01);
(Continued)

(58) Field of Classification Search
CPC ......... G02F 1/133308; G02F 1/133502; G02F 2001/133331; G02F 2201/28; C03C 19/00;
(Continued)

(56) References Cited

U.S. PATENT DOCUMENTS

2013/0029075 A1 1/2013 Niiyama et al.
2015/0183179 A1* 7/2015 Frank .................. B22D 19/0081
428/192
2016/0282527 A1* 9/2016 Saito ..................... C03B 33/091

FOREIGN PATENT DOCUMENTS

JP        2015-211190       11/2015
WO    WO 2011/148990 A1    12/2011
WO    WO 2015/098641 A1     7/2015

OTHER PUBLICATIONS

International Search Report dated Aug. 22, 2017 in PCT/JP2017/019708, filed on May 26, 2017 (with English Translation).

(Continued)

*Primary Examiner* — Nathanael R Briggs
*Assistant Examiner* — William D Peterson
(74) *Attorney, Agent, or Firm* — Oblon, McClelland, Maier & Neustadt, L.L.P.

(57) ABSTRACT

A cover glass for covering a display panel of a display device, includes a front surface not to be faced to the display panel, a back surface to be faced the display panel, a front-side chamfered part which is a chamfered part on the side of the front surface, and a back-side chamfered part which is a chamfered part on the side of the back surface. The front-side chamfered part has a surface roughness Ra of more than 100 nm. The back-side chamfered part has a surface roughness Ra of 100 nm or less.

18 Claims, 4 Drawing Sheets

(51) Int. Cl.
  *C03C 19/00*   (2006.01)
  *C03C 21/00*   (2006.01)
  *G02B 1/11*    (2015.01)
  *G02F 1/1335*  (2006.01)

(52) U.S. Cl.
  CPC .......... *G02B 1/11* (2013.01); *G02F 1/133502* (2013.01); *G09F 9/00* (2013.01); *C09J 2203/318* (2013.01); *G02F 2001/133331* (2013.01); *G02F 2202/28* (2013.01)

(58) Field of Classification Search
  CPC ... C03C 21/00; G09F 9/00; G02B 1/11; C09J 2201/318
  USPC .......................................................... 349/56
  See application file for complete search history.

(56) References Cited

OTHER PUBLICATIONS

Written Opinion dated Aug. 22, 2017 in PCT/JP2017/019708, filed on May 26, 2017.

\* cited by examiner

COVER GLASS AND DISPLAY DEVICE

TECHNICAL FIELD

The present invention relates to a cover glass and a display device.

BACKGROUND ART

Conventionally, in order to protect a display panel of a display device having a liquid crystal panel or the like, a transparent protective member that covers a display surface (display area) of the display panel has been used. As the protective member for protecting the display device as described above, for example, Patent Document 1 describes an adhesive layer-attached transparent surface material, in which an adhesive layer is formed on a surface thereof.

PRIOR ART DOCUMENT

Patent Document

Patent Document 1: WO 2011/148990

SUMMARY OF THE INVENTION

Problems that the Invention is to Solve

On a vehicle such as an automobile, an on-vehicle display device such as a car navigation device is mounted. The car navigation device is mainly used by an occupant on a front sheet (a driver's sheet or a front passenger's sheet), and often used in a state of being stood on the outside of a dashboard or a state of being embedded in the dashboard.

In addition, recently, an on-vehicle display device for rear sheet, specifically, a rear sheet entertainment (RSE) device for an occupant on the rear sheet to view video images and the like has been prevalent, and, for example, is often attached to a back side of the front sheet to be used.

Also in each of these on-vehicle display devices, a transparent protective member such as a film is used from the viewpoint of display panel protection. However, recently, from the viewpoint of texture, it has been desired to use a cover glass as a glass-made protective member instead of the film.

The cover glass for the on-vehicle display device (hereinafter also simply referred to as the "cover glass") is required to have such high impact resistance that it does not break even when the head or the like of a passenger colloids therewith in a case where a collision accident of the vehicle occurs, from the viewpoint of safety.

In a case where the collision accident of the vehicle occurs, the head of the passenger sometimes colloids with not only a part in a vicinity of a central part of the cover glass but also a part in a vicinity of an end part of the cover glass. When the head of the passenger colloids with the end part of the cover glass, a crack is sometimes generated in the cover glass from this end part as a starting point.

In particular, the collision of the head of the passenger with the part in the vicinity of the end part of the cover glass is remarkable in the cover glass used in the on-vehicle display device for rear sheet.

Accordingly, high end part impact resistance is required for the cover glass, particularly for the cover glass used in the on-vehicle display device for rear sheet.

By the way, it has been known that the end part of the cover glass of the display device sometimes develops gradational color and becomes radiant. This phenomenon is hereinafter also referred to as "gradation" for the sake of convenience. As a result of investigation for this gradation, the present inventors have made clear that (1) an antireflection film is usually formed on a front surface not facing a display panel in the cover glass for the display device, that (2) the antireflection film is also sometimes formed on a part of an end surface of the cover glass inevitably in the film forming process, that (3) the gradation occurs by reflection of display images of the display panel on the end surface of the cover glass on which the antireflection film is formed, and the like. With recent tendency to further enhance the texture of the display device, the occurrence of the gradation is sometimes recognized as a display defect (hereinafter also referred to as an "end part display defect").

The present invention has been made in consideration of the above circumstances, and an object thereof is to provide a cover glass having high end part impact resistance and being able to suppress an end part display defect, and a display device using the same.

Means for Solving the Problems

As a result of intensive investigation for achieving the above-described object, the present inventors have found that the occurrence of the gradation can be suppressed while improving the impact resistance of the end part by regulating the surface roughness of chamfered parts of the cover glass to proper ranges for respective sites, thereby completing the present invention.

That is, a cover glass according to one aspect of the present invention is a cover glass for covering a display panel of a display device, including a front surface not to be faced to the above-described display panel, a back surface to be faced to the above-described display panel, a front-side chamfered part which is a chamfered part on the side of the above-described front surface and a back-side chamfered part which is a chamfered part on the side of the above-described back surface, in which the above-described front-side chamfered part has a surface roughness Ra of more than 100 nm, and the above-described back-side chamfered part has a surface roughness Ra of 100 nm or less.

In addition, a display device according to another aspect of the present invention is a display device having the above-described cover glass.

Advantageous Effects of the Invention

According to the present invention, there can be provided a cover glass which has high end part impact resistance and can suppress an end part display defect, and a display device using the same.

MODE FOR CARRYING OUT THE INVENTION

An embodiment of the present invention will be described below with reference to the drawings. Although a cover glass of an on-vehicle display device is described as an example in the following embodiment, the present invention should not be limited to the following embodiment. Various modifications and substitutions can be made in the following embodiment without departing from the scope of the present invention, and the cover glass can also be used in a display device for other than on-vehicle use. In the present description, "to" means that the value is equal to or larger than the lower limit value thereof and equal to or smaller than the higher limit value thereof.

<On-Vehicle Display Device>

Figure 1:
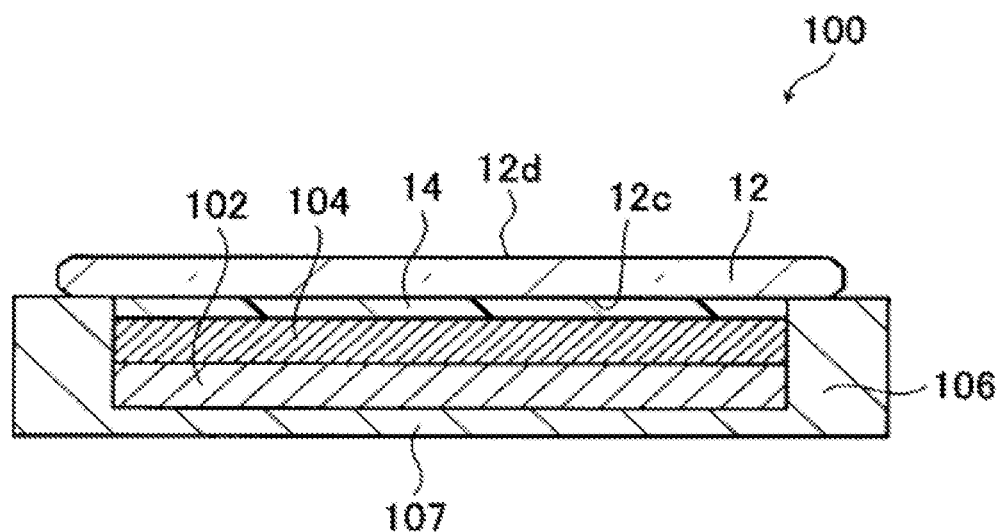
FIG. 1 is a cross-sectional view illustrating an on-vehicle display device.

FIG. 1 is a cross-sectional view illustrating an on-vehicle display device 100.

The on-vehicle display device 100 illustrated in FIG. 1 is a rear sheet entertainment (RSE) device as an example, and is attached to a back side of a front sheet of an automobile to be used.

The on-vehicle display device 100 has a housing 106 for housing respective parts. A backlight unit 102 is disposed on a housing bottom plate 107 which is a bottom plate of the housing 106, and a display panel 104 is disposed on the backlight unit 102. The display panel 104 is a liquid crystal panel as an example. An opening part surrounded by side surfaces and the like of the housing 106 is formed in the housing 106.

Configurations of the backlight unit 102 and the display panel 104 are not particularly limited, and well-known ones can be used. Similarly, a material and the like of the housing 106 (including the housing bottom plate 107) are also not particularly limited.

The on-vehicle display device is not limited to one having the liquid crystal panel as the display panel, and may be one having, for example, an organic EL panel, a PDP, an electronic ink panel or the like. It may have a touch panel or the like.

As illustrated in FIG. 1, the cover glass 12 is laminated to the display panel 104 by means of an adhesive layer 14. The cover glass 12 functions as a protective member of the display panel 104.

The cover glass 12 has a back surface 12c facing the display panel 104 and a front surface 12d not facing the display panel 104, on the opposite side of the back surface 12c.

FIG. 1 illustrates an embodiment in which an end part of the cover glass 12 is exposed without being housed in the housing 106. However, the present invention is not limited to this embodiment. For example, the present invention may be an embodiment in which an end surface of the cover glass 12 is in contact with an inner wall surface of the housing 106, or an embodiment in which the housing 106 covers the end part of the cover glass 12.

It is preferred that the adhesive layer 14 is transparent as with the cover glass 12, and that the difference in refractive index between the cover glass 12 and the adhesive layer 14 is small. The adhesive layers 14 include, for example, a layer composed of a transparent resin obtained by curing a liquid curable resin composition, and may include an OCA (optical clear adhesive) film or tape. The thickness of the adhesive layer 14 is, for example, from 5 to 400 μm, and preferably from 50 to 200 μm.

<Cover Glass>

Figure 2:
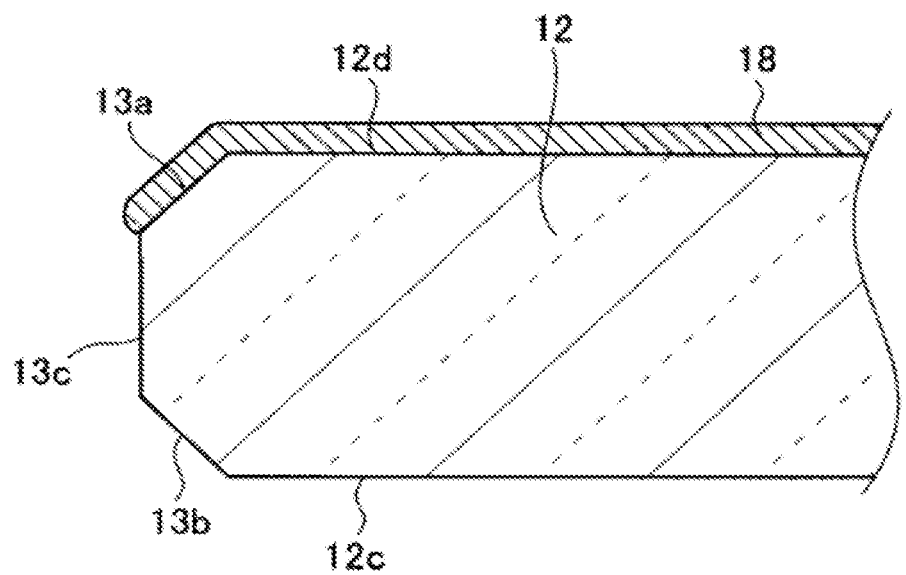
FIG. 2 is an enlarged cross-sectional view illustrating a cover glass.

FIG. 2 is an enlarged cross-sectional view illustrating the cover glass 12.

The cover glass 12 originally has an end surface which connects the back surface 12c and the front surface 12d, and chamfering is performed to a connecting portion of the end surface and the back surface 12c or the front surface 12d.

Thus, as illustrated in FIG. 2, the cover glass 12 has a front-side chamfered part 13a which is a chamfered part on the side of the front surface 12d, a back-side chamfered part 13b which is a chamfered part on the side of the back surface 12c, and a side surface part 13c connected to the front-side chamfered part 13a and the back-side chamfered part 13b. The side surface part 13c may be either a surface formed by chamfering or a part of the end surface not chamfered.

<<Surface Roughness>>

In this embodiment, the front-side chamfered part 13a has a surface roughness Ra of more than 100 nm. Thereby, the occurrence of gradation is suppressed, and an end part display defect can be suppressed.

When an antireflection film 18 is formed on the front surface 12d and the front-side chamfered part 13a, the gradation can sometimes occur on the front-side chamfered part 13a. Then, the occurrence of the gradation is sometimes recognized as the display defect (end part display defect). In the cover glass 12 of this embodiment, the front-side chamfered part 13a has a surface roughness Ra as high as more than 100 nm. Therefore, even when the antireflection film 18 is formed on/above the front-side chamfered part 13a, the occurrence of the gradation can be suppressed.

Because the end part display defect can be further suppressed, the surface roughness Ra of the front-side chamfered part 13a is preferably 140 nm or more, more preferably 170 nm or more, and still more preferably 210 nm or more.

Although not particularly limited, the upper limit of the surface roughness Ra of the front-side chamfered part 13a is, for example, 500 nm or less, and preferably 400 nm or less.

The cover glass 12 is required to have such high impact resistance that it does not break even when the head or the like of a passenger colloids therewith in a case where a collision accident of a vehicle occurs.

In particular, when the on-vehicle display device 100 is the RSE device, the head of the passenger often colloids with a part in a vicinity of the end part (a site including the front-side chamfered part 13a and the back-side chamfered part 13b) of the cover glass 12 in a case where the collision accident of the vehicle occurs. Accordingly, the cover glass 12 is required to have high end part impact resistance.

In this embodiment, the back-side chamfered part 13b has a surface roughness Ra of 100 nm or less. Thereby, a crack is suppressed from being generated in the cover glass 12 to cause excellent end part impact resistance. When the head of the passenger colloids with the end part of the cover glass 12, large stress is generated in the back-side chamfered part 13b. Then, the crack is generated in the cover glass 12 by the stress generated, from a flaw in the back-side chamfered part 13b formed during processing thereof and the like as a starting point.

The depth of the flaw in the back-side chamfered part 13b can be reduced by regulating the surface roughness Ra of the back-side chamfered part 13b to 100 nm or less. As a result, even when the large stress is generated in the back-side chamfered part 13b, the crack is suppressed from being generated in the cover glass 12 from the back-side chamfered part 13b as the starting point.

Because the end part impact resistance is more excellent, the surface roughness Ra of the back-side chamfered part 13b is preferably 70 nm or less, more preferably 30 nm or less, and still more preferably 10 nm or less. Although not particularly limited, the lower limit of the surface roughness Ra of the back-side chamfered part 13b is, for example, 0.1 nm or more.

The surface roughness Ra (arithmetic average roughness) is a value measured according to JIS B 0601:2001. In addition, when the cover glass 12 is a strengthened glass, the surface roughness Ra is a value of the cover glass 12 subjected to strengthening.

The direction of processing flaws generated in the front-side chamfered part 13a and the back-side chamfered part 13b by chamfering is a horizontal direction (a direction from the back side to the front side or the reverse direction thereof in FIG. 2). The moving direction of a probe in measurement of the surface roughness Ra is the same as this direction of the processing flaws.

The shape of the front-side chamfered part 13a and the back-side chamfered part 13b is not particularly limited.

At least one or both of the front-side chamfered part 13a and the back-side chamfered part 13b may be either C-chamfered parts or R-chamfered parts.

The C-chamfered part is a chamfered part in which a surface formed by chamfering is a plane or substantially plane surface (see FIG. 2). On the other hand, the R-chamfered part is a chamfered part in which a surface formed by chamfering is a curved surface.

<<Antireflection Film>>

The antireflection film 18 is preferably provided on/above the front surface 12d of the cover glass 12. Thereby, display images of the display panel 104 can be made clear. The antireflection film 18 will be described herein.

A material of the antireflection film 18 is not particularly limited, and various materials can be used as long as they are materials which can suppress light reflection. For example, a configuration in which a high refractive index layer and a low refractive index layer are laminated may be used. The high refractive index layer as used herein is a layer having a refractive index of 1.9 or more at a wavelength of 550 nm, and the low refractive index layer is a layer having a refractive index of 1.6 or less at a wavelength of 550 nm.

It may be a configuration containing one layer of each of high refractive index layer and low refractive index layer, or a configuration containing two or more layers of them each. In the case of containing two or more layers of each of high refractive index layer and low refractive index layer, a configuration in which the high refractive index layers and the low refractive index layers are laminated alternately is preferred.

Materials of the high refractive index layer and the low refractive index layer are not particularly limited, and can be selected in consideration of the degree of antireflection required, productivity and the like.

As the material composing the high refractive index layer, for example, a material containing one or more kinds selected from the group consisting of niobium, titanium, zirconium, tantalum and silicon can be preferably used. Specific examples thereof include niobium oxide ($Nb_2O_5$), titanium oxide ($TiO_2$), zirconium oxide ($ZrO_2$), tantalum oxide ($Ta_2O_5$), silicon nitride and the like.

As the material composing the low refractive index layer, for example, a material containing silicon can be preferably used. Specific examples thereof include silicon oxide ($SiO_2$), a material containing a mixed oxide of Si and Sn, a material containing a mixed oxide of Si and Zr, a material containing a mixed oxide of Si and Al and the like.

A method for forming the antireflection film 18 is not particularly limited, and various film formation methods are available. In particular, it is preferred to perform film formation by methods such as pulse sputtering, AC sputtering and digital sputtering.

For example, when the film formation is performed by the pulse sputtering, a glass substrate is disposed in a chamber having a mixed gas atmosphere of an inert gas and an oxygen gas, and a target is selected so as to obtain a desired composition thereto, thereby enabling the film formation.

The film thickness of the antireflection film 18 is, for example, from about 100 to 300 nm.

<<Strengthened Glass>>

As the cover glass 12, the strengthened glass is preferably used. Typical examples of the strengthened glass include chemically strengthened glass and physically strengthened glass. Among them, the chemically strengthened glass is preferred as the cover glass 12, from the viewpoints of strength, designability, cost and the like.

A compressive stress layer is formed on a surface of the strengthened glass. The thickness (DOL) of the compressive stress layer is, for example, 10 μm or more, and from the viewpoint of durability against flaws or the like, it is preferably 15 μm or more, more preferably 25 μm or more, and still more preferably 30 μm or more.

The surface compressive stress (CS) in the compressive stress layer of the strengthened glass is, for example, 500 MPa or more, preferably 650 MPa or more, and more preferably 750 MPa or more. Although not particularly limited, the upper limit thereof is, for example, 1200 MPa or less.

Typical examples of methods for obtaining the strengthened glass (chemically strengthened glass) by subjecting glass to chemical strengthening include a method of immersing glass in a molten salt of $KNO_3$, subjecting it to ion exchange treatment, and thereafter cooling it to around room temperature. Treatment conditions such as the temperature of the molten salt of $KNO_3$ and the immersing time may be set so that the surface compressive stress and the thickness of the compressive stress layer reach desired values.

The kinds of glass include, for example, soda-lime glass, aluminosilicate glass ($SiO_2$—$Al_2O_3$—$Na_2O$-based glass) and the like. Among them, the aluminosilicate glass is preferred from the viewpoint of strength.

Examples of glass materials include a glass material containing, by mol %, 50 to 80% of $SiO_2$, 1 to 20% of $Al_2O_3$, 6 to 20% of $Na_2O$, 0 to 11% of $K_2O$, 0 to 15% of MgO, 0 to 6% of CaO and 0 to 5% of $ZrO_2$.

Glass for chemical strengthening (for example, "DRAGONTRAIL (registered trade mark)") based on aluminosilicate glass is also suitably used.

<<Plate Thickness, Size and Shape>>

The plate thickness of the cover glass 12 is preferably from 0.5 to 2.5 mm. When the plate thickness of the cover glass 12 is within this range, durability to bending fracture of the back surface 12c in the case of performing a head impact test described later is increased. This is therefore preferred. For the same reason, the plate thickness of the cover glass 12 is more preferably from 0.7 to 2.0 mm, and still more preferably from 1.3 to 2.0 mm.

The external shape and size of the cover glass 12 are appropriately determined depending on the external shape of the on-vehicle display device. The external shape of the on-vehicle display device is generally a rectangular shape such as a rectangle. In that case, therefore, the external shape of the cover glass 12 is a rectangular shape. Depending on the external shape of the on-vehicle display device, the cover glass 12 which covers the entire surface of a display surface of the display panel and has a shape including a curve in the external shape can also be used.

As an example of the size of the cover glass 12, for example, in the case of the rectangular shape, it is from 100 to 900 mm in a longitudinal direction and from 40 to 500 mm in a transverse direction, and preferably from 100 to 800 mm in the longitudinal direction and from 40 to 300 mm in the transverse direction.

The size of the front surface 12d or the back surface 12c of the cover glass 12 is preferably, for example, from 5 to 20 inches.

<<Functional Layer>>

A functional layer is preferably formed on each of the front surface 12d and the back surface 12c of the cover glass 12. Thereby, the display images of the display panel 104 can be viewed more clearly.

The above-described functional layer may be formed by treating a surface layer of the cover glass 12, or may be formed by laminating another layer on a surface of the cover glass 12.

The above-described functional layers include, for example, an antiglare layer (AG layer). When the AG layer is provided on the front surface 12d of the cover glass 12, glare of external light can be reduced in the case of viewing the display images of the display panel 104. Therefore, the display images can be clearly viewed. Methods for forming the AG layer are not particularly limited, but include, for example, a method of etching the surface layer of the cover glass 12, a method of applying a coating liquid containing fine particles and a matrix on the front surface of the cover glass 12 and curing the matrix, and the like.

The above-described functional layers also include an antifingerprint layer (AFP layer). When the AFP layer is provided on the front surface 12d of the cover glass 12, even by touching the front surface 12d of the cover glass 12, no fingerprint remains on the front surface 12d, thereby making it possible to keep the front surface 12d clean. Accordingly, in the case of viewing the display images of the display panel 104, the display images can be clearly viewed.

The above-described functional layers also include a light shielding layer. The light shielding layer is preferably provided on the back surface 12c of the cover glass 12. Wiring of the display panel 104 or a joint part of the cover glass 12 and the display panel 104 can be concealed by forming the light shielding layer to enhance the designability of the display device. The above-described light shielding layer can be formed, for example, by applying a printing paint to a peripheral edge of the back surface 12c of the cover glass 12 using a method such as a screen printing method, followed by drying.

Screen printing and the like may be performed on parts of the front surface 12d and the back surface 12c of the cover glass 12.

<<Modification Example (Laminated Glass)>>

Figure 3:
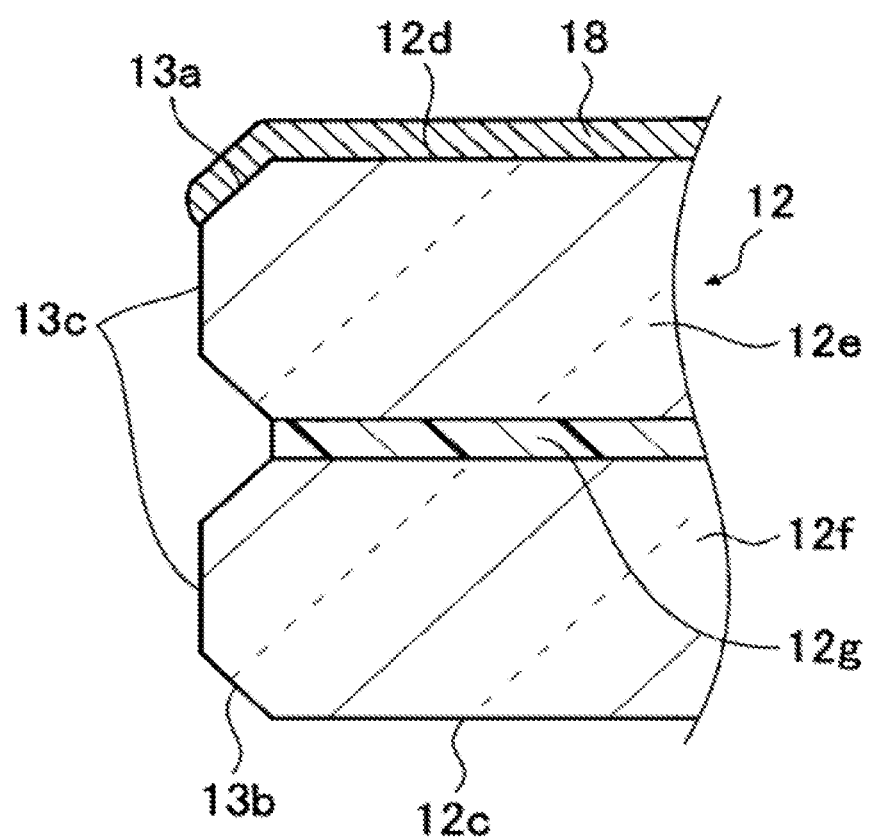
FIG. 3 is a cross-sectional view illustrating a modified example of a cover glass.

FIG. 3 is a cross-sectional view illustrating a modification example of the cover glass 12. In FIG. 3, the same reference numerals are used for similar or the same components as those illustrated in FIG. 1 and FIG. 2.

As illustrated in FIG. 3, the cover glass 12 may be a laminated glass. In this case, a first glass plate 12e having a front surface 12d which is a surface not to be faced to the display panel 104 and a second glass plate 12f having a back surface 12c which is a surface to be faced to the display panel 104 are bonded to each other with an intermediate layer 12g interposed therebetween.

As illustrated in FIG. 3, when the cover glass 12 is the laminated glass, a chamfered part on the side of the front surface 12d of the first glass plate 12e is a front-side chamfered part 13a and a chamfered part on the side of the back surface 12c of the second glass plate 12f is a back-side chamfered part 13b. Then, the front-side chamfered part 13a has a surface roughness Ra of more than 100 nm, and the back-side chamfered part 13b has a surface roughness Ra of 100 nm or less.

When the cover glass 12 is the laminated glass, the surface roughness of the other chamfered parts is not particularly limited.

As the intermediate layer 12g, for example, PVB (polyvinyl butyral), EVA (ethylene vinyl acetate) or the like can be used.

<<Method for Producing Cover Glass, etc.>>

Methods for chamfering the cover glass 12 and adjusting the surface roughness Ra are not particularly limited. For example, methods such as polishing using a chamfering wheel, laser processing (for example, laser processing disclosed in WO 2015/098641) and brush polishing (for example, polishing using a brush polishing device disclosed in WO 2015/108076) can be used either alone or in combination thereof as needed.

As an example of a method for producing the cover glass 12 of this embodiment, a glass plate is polished using a chamfering wheel having a coarse particle size (for example, a grit size of #600) to perform chamfering, thereby forming the front-side chamfered part 13a and the back-side chamfered part 13b. Then, only the back-side chamfered part 13b is polished using a chamfering wheel having a fine particle size (for example, a grit size of #6000). Thus, the cover glass 12 in which the front-side chamfered part 13a has a surface roughness Ra of more than 100 nm and the back-side chamfered part 13b has a surface roughness Ra of 100 nm or less can be obtained.

As another example of a method for producing the cover glass 12 of this embodiment, a glass plate is chamfered by laser processing disclosed in WO 2015/098641 to form the front-side chamfered part 13a and the back-side chamfered part 13b. At this time, the front-side chamfered part 13a and the back-side chamfered part 13b become mirror surfaces (the surface roughness Ra is 100 nm or less). Thereafter, only the front-side chamfered part 13a is polished using a chamfering wheel having a coarse particle size (for example, a grit size of #600). Thus, the cover glass 12 in which the front-side chamfered part 13a has a surface roughness Ra of more than 100 nm and the back-side chamfered part 13b has a surface roughness Ra of 100 nm or less can be obtained.

When the cover glass 12 is produced, it is preferred that strengthening such as the chemical strengthening described above is appropriately performed to the glass plate which has been subjected to the chamfering and the adjustment of the surface roughness Ra.

Furthermore, treatment including acid treatment and alkali treatment may be performed to the glass plate which has been subjected to the chemical strengthening.

The acid treatment is performed by immersing the chemically strengthened glass in an acidic solution. Thereby, Na and/or K on a surface of the chemically strengthened glass are substituted with H to form a low-density layer. An acid used for the acidic solution may be either a weak acid or a strong acid, and suitable examples thereof include acids such as hydrochloric acid, nitric acid, sulfuric acid, phosphoric acid, acetic acid, oxalic acid, carbonic acid and citric acid. These acids may be used either alone or in combination of two or more thereof.

The concentration of the acidic solution is preferably such a concentration that there is little fear for container corrosion, and specifically, it is preferably from 1 to 20% by mass.

The temperature at which the acid treatment is performed is preferably 100° C. or lower.

The time for which the acid treatment is performed is from 10 seconds to 5 hours, and more preferably from 1 minute to 2 hours, from the viewpoint of productivity.

The alkali treatment is performed by immersing in a basic solution the chemically strengthened glass subjected to the acid treatment. Thereby, a part or the whole of the low-density layer formed by the acid treatment is removed. Effects of improving surface strength of the chemically strengthened glass and the like can be expected by removing the low-density layer. A base used for the basic solution may be either a weak base or a strong base, and suitable examples thereof include bases such as sodium hydroxide, potassium hydroxide, potassium carbonate and sodium carbonate. These bases may be used either alone or in combination of two or more thereof.

The concentration of the basic solution is preferably from 1 to 20% by mass.

The temperature at which the alkali treatment is performed is preferably from 0 to 100° C., more preferably from 10 to 80° C., and still more preferably from 20 to 60° C., because there is no fear for glass corrosion.

The time for which the alkali treatment is performed is preferably from 10 seconds to 5 hours, and more preferably from 1 minute to 2 hours, from the viewpoint of productivity.

Even when the strengthening such as the chemical strengthening is performed to the glass plate, the value of the surface roughness Ra is not usually changed. Accordingly, it is preferred to adjust the surface roughness Ra before performing the strengthening.

In the case of performing such treatment that the surface roughness Ra is changed, it is preferred to perform the chamfering and the adjustment of the surface roughness Ra so that the surface roughness Ra after the change falls within the range of the present invention, and thereafter appropriately perform the strengthening such as the above-described chemical strengthening to the glass plate.

EXAMPLES

An embodiment of the present invention will be specifically described below with reference to Examples. However, the present invention should not be construed as being limited by these examples.

<Preparation of Cover Glass>

First, as a glass plate, glass for chemical strengthening ("DRAGONTRAIL" manufactured by Asahi Glass Co., Ltd., plate thickness: 1.3 mm) based on aluminosilicate glass was prepared. The glass plate thus prepared was chamfered, and then, subjected to chemical strengthening, acid treatment and alkali treatment in this order, thereby obtaining cover glass 12.

As described below, in Examples 1 and 2 and Comparative Examples 1 and 2, the chamfering was performed by different methods.

Example 1

An end part of the glass plate was chamfered by polishing using a chamfering wheel having a particle size of #600 to form a front-side chamfered part 13a and a back-side chamfered part 13b. Thereafter, only the back-side chamfered part 13b was chamfered using a chamfering wheel having a particle size of #6000. The surface roughness Ra of the front-side chamfered part 13a was 230 nm, and the surface roughness Ra of the back-side chamfered part 13b was 5 nm.

The surface roughness Ra was measured in accordance with JIS B 0601:2001, using a laser microscope "VK-9500" manufactured by Keyence Corporation, and the cutoff value $\lambda_c$ was set to 0.25 mm (hereinafter the same).

The chemical strengthening was performed to the resulting glass plate. The chemical strengthening was performed by immersing the whole glass plate in a molten salt of $KNO_3$ so as to attain the thickness (DOL) of a compressive stress layer: 35 μm and the surface compressive stress (CS) in the compressive stress layer: 750 MPa.

Then, the glass plate subjected to the above-described chemical strengthening was immersed in hydrochloric acid for 120 seconds, thereby performing the acid treatment, thereafter, washed a plurality of times with pure water, and dried with an air blower. As the above-described hydrochloric acid, 13.4% by mass of hydrochloric acid (manufactured by Kanto Chemical Co., Inc.) prepared in a beaker and adjusted to a temperature of 40° C. using a water bath was used.

Next, the glass plate subjected to the above-described acid treatment was immersed in an aqueous sodium hydroxide solution for 120 seconds, thereby performing the alkali treatment, thereafter, washed a plurality of times with pure water, and dried with an air blower. As the above-described aqueous sodium hydroxide solution, 4.0% by mass of an aqueous sodium hydroxide solution prepared in a beaker and adjusted to a temperature of 40° C. using a water bath was used.

Thereby, a cover glass 12 was obtained. The surface roughness Ra of the front-side chamfered part 13a of the cover glass 12 subjected to the chemical strengthening was 230 nm, and the surface roughness Ra of the back-side chamfered part 13b was 5 nm.

Example 2

An end part of the glass plate was chamfered by laser processing disclosed in WO 2015/098641 to form a front-side chamfered part 13a and a back-side chamfered part 13b. For a laser beam, YAG laser (wavelength: 2940 nm, output: 32 W) was used as a light source. More specifically, the glass plate was irradiated vertically with the laser beam, thereby forming scribes on places where chamfered parts were desired to be formed on a front surface 12d and a back surface 12c, and the scribes were extended to form a front-side chamfered part 13a and a back-side chamfered part 13b.

Thereafter, only the front-side chamfered part 13a was polished using a chamfering wheel having a particle size of #600. The surface roughness Ra of the front-side chamfered part 13a was 230 nm, and the surface roughness Ra of the back-side chamfered part 13b was 9 nm.

The chemical strengthening, acid treatment and alkali treatment were performed by the same methods as in Example 1 to obtain a cover glass 12. The surface roughness Ra of the front-side chamfered part 13a of the cover glass 12 subjected to the chemical strengthening was 230 nm, and the surface roughness Ra of the back-side chamfered part 13b was 9 nm.

Example 3

An end part of the glass plate was chamfered by polishing using a chamfering wheel having a particle size of #400 to form a front-side chamfered part 13a. Thereafter, the back-side chamfered part 13a was polished using a chamfering wheel having a particle size of #800.

The end part of the glass plate was chamfered by polishing using a chamfering wheel having a particle size of #600 to form a back-side chamfered part 13b. Thereafter, the back-side chamfered part 13b was polished using a chamfering wheel having a particle size of #1200 and a chamfering wheel having a particle size of #3000 in this order.

The surface roughness Ra of the front-side chamfered part 13a was 170 nm, and the surface roughness Ra of the back-side chamfered part 13b was 60 nm.

The chemical strengthening, acid treatment and alkali treatment were performed by the same methods as in Example 1 to obtain a cover glass 12. The surface roughness Ra of the front-side chamfered part 13a of the cover glass 12 subjected to the chemical strengthening was 170 nm, and the surface roughness Ra of the back-side chamfered part 13b was 60 nm.

Comparative Example 1

An end part of the glass plate was chamfered by polishing using a grindstone-electrodeposited chamfering wheel having a particle size of #600 to form a front-side chamfered part 13a and a back-side chamfered part 13b. Both the surface roughness Ra of the front-side chamfered part 13a and the surface roughness Ra of the back-side chamfered part 13b were 230 nm.

The chemical strengthening, acid treatment and alkali treatment were performed by the same methods as in Example 1 to obtain a cover glass 12. The surface roughness Ra of the front-side chamfered part 13a of the cover glass 12 subjected to the chemical strengthening was 230 nm, and the surface roughness Ra of the back-side chamfered part 13b was 230 nm.

Comparative Example 2

The glass plate was inclined and chamfered using a brush polishing device disclosed in FIG. 2 of WO 2015/108076 to form a front-side chamfered part 13a and a back-side chamfered part 13b. As a polishing liquid, one obtained by dispersing a polishing material composed of cerium oxide having an average particle size (D50) of 1.5 in water as a dispersion was used. Both the surface roughness Ra of the front-side chamfered part 13a and the surface roughness Ra of the back-side chamfered part 13b were 4 nm.

The chemical strengthening, acid treatment and alkali treatment were performed by the same methods as in Example 1 to obtain a cover glass 12. The surface roughness Ra of the front-side chamfered part 13a of the cover glass 12 subjected to the chemical strengthening was 4 nm, and the surface roughness Ra of the back-side chamfered part 13b was 4 nm.

<Preparation of Specimen>

In order to perform a test of colliding a rigid model (also called a "head impact test"), a specimen 200 of an on-vehicle display device was prepared using each of the cover glasses 12 of Examples 1 to 3 and Comparative Examples 1 and 2.

Figure 4:
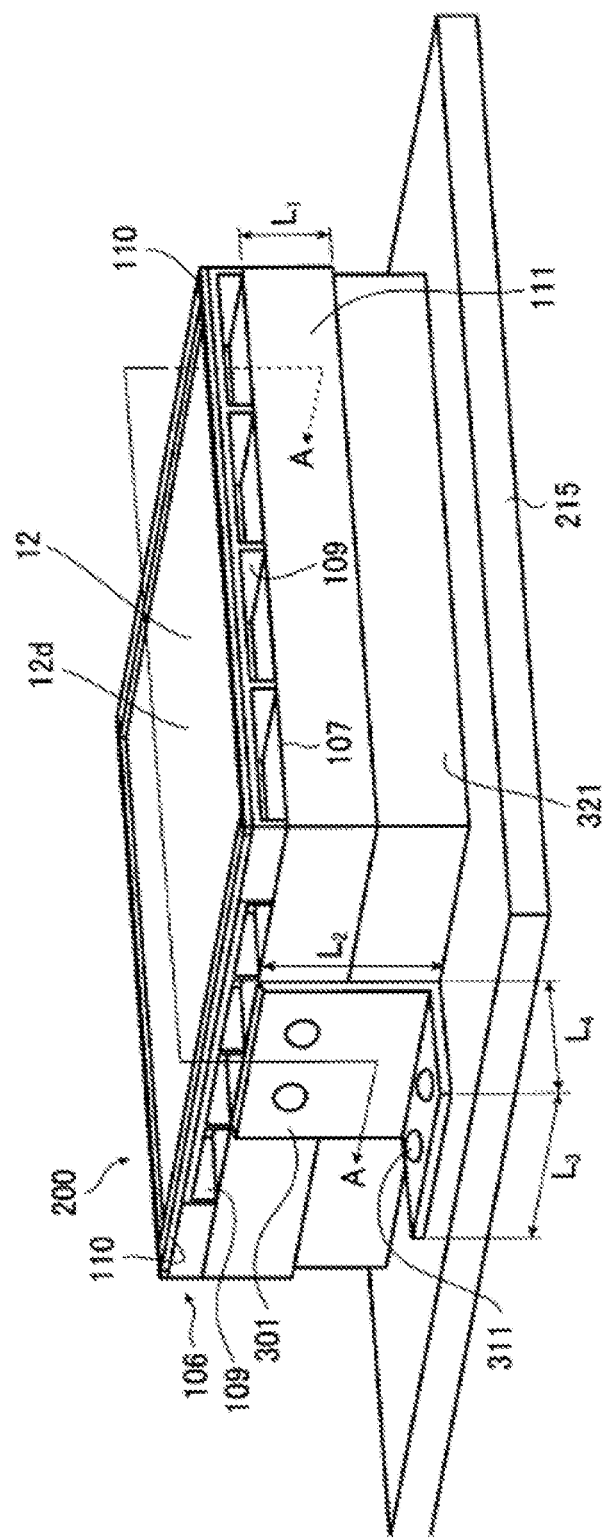
FIG. 4 is a perspective view illustrating a specimen.
Figure 5:
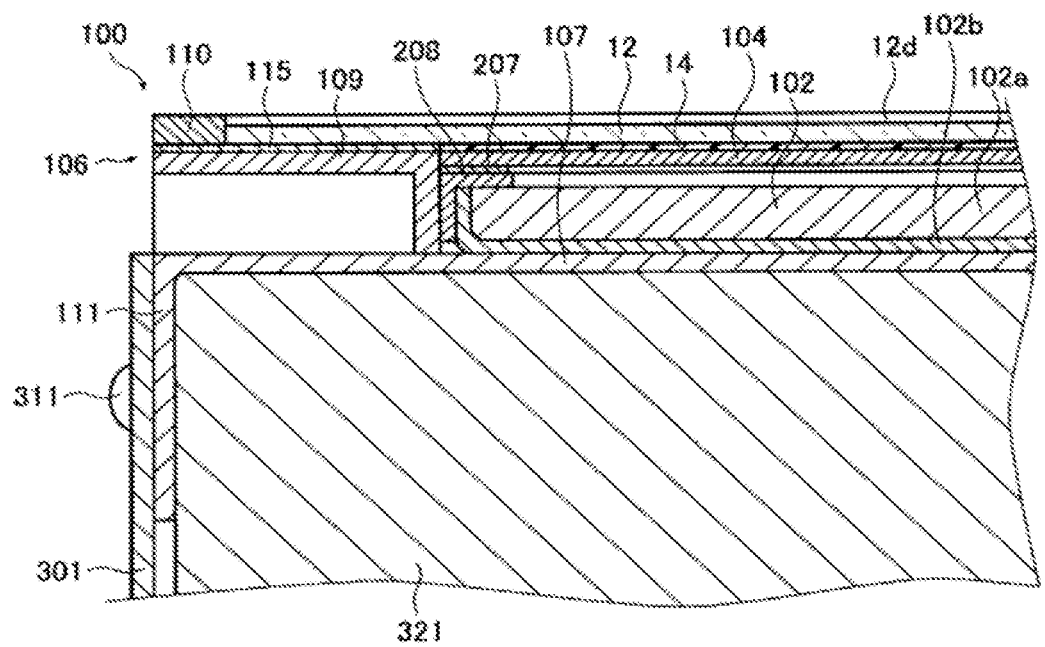
FIG. 5 is a cross-sectional view taken along line A-A of FIG. 4.
Figure 6:
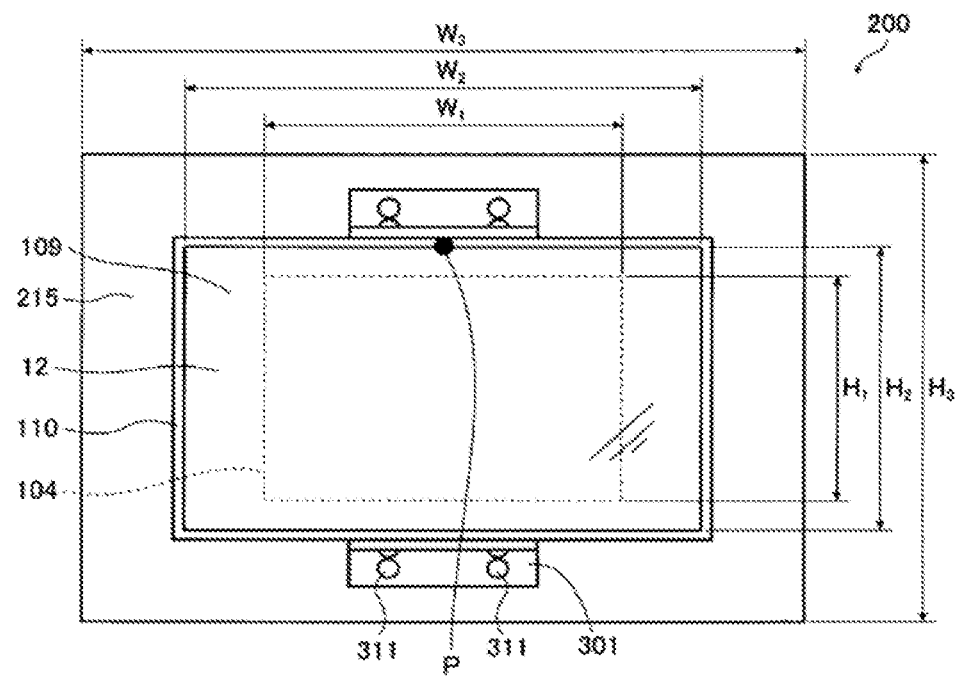
FIG. 6 is a plan view illustrating the specimen.

The specimen 200 will be described with reference to FIG. 4 to FIG. 6. In FIG. 4 to FIG. 6, the same (or corresponding) components as those of the on-vehicle display device 100 in FIG. 1 are designated by the same reference numerals, and the descriptions thereof are sometimes omitted.

FIG. 4 is a perspective view illustrating the specimen 200. FIG. 5 is a cross-sectional view taken along line A-A of FIG. 4. FIG. 6 is a plan view illustrating the specimen 200.

As illustrated in FIG. 4 and FIG. 5, the specimen 200 has the housing bottom plate 107, and four housing frames 109 each having ribs in the inside thereof are disposed on a peripheral part of the housing bottom plate 107. The housing 106 having a rectangular recessed part in a central region is formed by the housing bottom plate 107 and the four housing frames 109, and the backlight unit 102 and the display panel 104 are arranged in this housing 106.

As illustrated in FIG. 5, an upper surface side end part of the backlight unit 102 is covered with an L-shaped member 208 having an L shape in cross-section. An upper surface of the L-shaped member 208 and a lower surface side end part of the display panel 104 are bonded to each other by means of a double-sided tape 207. Accordingly, an air gap (1.5 mm) corresponding to the thickness of the L-shaped member 208 and the double-sided tape 207 is present between the display panel 104 and the backlight unit 102. The adhesive layer 14 is laminated to an upper surface of the display panel 104. A lower surface of the cover glass 12 and an upper surface of the housing frame 109 are laminated to each other with a double-sided tape 115. A housing end frame 110 is disposed outside an end surface of the glass cover 12 and on the upper surface of the housing frame 109. The housing end frame 110 is also laminated to the housing frame 109 by means of the double-sided tape 115.

As illustrated in FIG. 4 and FIG. 5, plate-like housing protrusion parts 111 are provided continuously to the housing bottom plate 107 on four sides of the housing bottom plate 107. A recessed part is formed on the back surface side of the housing bottom plate 107 (on the side opposite to the backlight unit 102 side) by the housing bottom plate 107 and the four housing protrusion parts 111. A part of a cushioning material 321 enters this recessed part. The cushioning material 321 is disposed on a flat support plate 215, and the housing 106 is supported by the cushioning material 321. As the cushioning material 321, a two-layered laminate of "CF45" manufactured by K.C.C. Shokai Co., Ltd. (thickness: 25.4 mm) was used. In a state where the housing 106 is supported by the cushioning material 321, one end side of a fixing part 301 is joined to each of a pair of surfaces of the housing protrusion parts 111 facing each other by means of bolts 311. The other end side of the fixing part 301 is joined to the support plate 215 by means of bolts 311. Thus, the position of the housing 106 including the housing protrusion parts 111 is fixed by the fixing part 301.

As for the fixing part 301 as a plate-like member having an L shape in cross-section, the sizes represented by $L_1$ to $L_4$ in FIG. 4 were $L_1$: 20 mm, $L_2$: 50 mm, $L_3$: 100 mm and $L_4$: 20 mm.

The sizes represented by $H_1$ to $H_3$ and $W_1$ to $W_3$ in FIG. 6 were $H_1$: 120 mm, $H_2$: 150 mm, $H_3$: 250 mm, $W_1$: 173 mm, $W_2$: 250 mm and $W_3$: 350 mm.

The other respective parts were as follows:

Adhesive layer 14 . . . OCA ("MHM-FWD" manufactured by Nichiei Kakoh Co., Ltd., thickness: 150 μm)

Display panel 104 . . . A replacement was used in which polarization plates (material: TAC) were each laminated to both surfaces of a soda-lime glass (plate thickness: 1.1 mm, size: 173 mm×120 mm).

Backlight unit 102 . . . A replacement was used in which a bottom surface and four side surfaces of a plate-like body 102a (material: PC, plate thickness: 4 mm, size: 117 mm×170 mm) were each covered with a recessed body 102b (material: aluminum, plate thickness: 1 mm).

Double-sided tape 207 . . . Material: PET, tape width: 5 mm, tape thickness: 0.5 mm L-shaped member 208 . . . Material: PVC, plate thickness: 1 mm, length of one side of L shape: 5 mm Housing frame 109 . . . Material: ABS, plate thickness: 2 mm Housing end frame 110 . . . Material: ABS, plate thickness: 2.5 mm, plate width: 5 mm Double-sided tape 115 . . . Material: PET, tape thickness: 0.5 mm Fixing part 301 . . . Material: iron (SS400), plate thickness: 1.0 mm Bolt 311 . . . Material: iron Cushioning material 321 . . . A two-layered laminate of "CF45" manufactured by K.C.C. Shokai Co., Ltd. (thickness: 25.4 mm)

Support plate 215 . . . Material: iron, plate thickness: 9 mm

Housing bottom plate 107 and housing protrusion part 111 . . . Material: iron, plate thickness: 1.15 mm <Evaluation of End Part Impact Resistance (Head Impact Test)>

Using the specimen 200 prepared, the head impact test was performed, and the end part impact resistance of the cover glass 12 was evaluated.

The support plate 215 of the specimen 200 was placed on a horizontal surface, and a spherical rigid model (material: iron, diameter: 165 mm, mass: 19.6 kg) not illustrated was dropped from a height of 793 mm at a collision speed of 3.944 m/s and allowed to collide with a collision position P (see FIG. 6) of the front surface 12*d* of the cover glass 12 so as to adjust the energy at the collision to 152.4 J.

The test method was performed with reference to "Attachment 28, Technical Standard for Instrument Panel Impact Absorption" (hereinafter simply referred to as "Standard") of "Article 20, Riding Accommodation" of "Safety Standard for Road Transport Vehicles" indicated by Ministry of Land, Infrastructure, Transport and Tourism in Japan. In this "Standard", a spherical rigid model (material: iron, diameter: 165 mm, mass: 6.8 kg) is ejected at a collision speed of 6.7 m/s and allowed to collide with a target, thereby adjusting the energy at the collision to 152.4 J.

That is, in the head impact test using the specimen 200, the energy at the collision was adjusted to be the same as that in "Standard".

With respect to the deceleration of the rigid model, it is regulated not to exceed 784 m/s² (80 G) continuously for 3 ms (milliseconds) or longer. However, in the test performed this time, it is confirmed that all satisfied this regulation.

In a top view of the specimen 200, the collision position P (see FIG. 6) on the cover glass 12 with which the rigid model was allowed to collide was a position shifted to the one fixing part 301 side than the center part and 1 mm inside from an endmost part of the cover glass 12.

Using each of the cover glasses 12 of Examples 1 to 3 and Comparative Examples 1 and 2, the specimen 200 was prepared and subjected to the head impact test.

As a result of the test, when the cover glass 12 was not broken, "A" is described, and when the cover glass 12 was broken, "B" is described, in the following Table 1. The case of "A" can be evaluated as one excellent in end part impact resistance.

<Evaluation of End Part Display Defect>

The antireflection film 18 having a film thickness of 243 nm was formed on the front surface 12*d* of each of the cover glasses 12 of Examples 1 to 3 and Comparative Examples 1 and 2 by sputtering. At this time, it was confirmed that the antireflection film 18 was also formed on the front-side chamfered part 13*a*.

The antireflection film 18 was specifically an antireflection film in which four layers in total of niobium oxide and silicon oxide were laminated in this order from the cover glass 12 side, and was formed by a method described in paragraphs [0105] and [0106] of JP-A-2016-029474.

Then, a cover glass of a commercially available on-vehicle display device for rear sheet was removed, and instead, the cover glass 12 on which the above-described antireflection film 18 was formed was attached. The on-vehicle display device for rear sheet used was the display device of a type that exposes the end part of the cover glass without being housed in the housing (see FIG. 1). Therefore, the end part of the cover glass 12 attached was also exposed without being housed in the housing. Next, it was confirmed whether or not the end part of the cover glass 12 sometimes developed gradational color and became radiant under the following conditions 1 to 3.

1: The cover glass is stood vertically to the ground and observed from a distance of 80 cm.

2: Observation is performed within a range between upper 45° and lower 45° from a vertical surface of the cover glass to a maximum extent.

3: Observation is performed under conditions of an indoor illuminance of 1500 1× (luxes).

As a result, when the gradation was not observed, "A" is described, and when the gradation was observed, "B" is described, in the following Table 1. The case of "A" can be evaluated as that the end part display defect could be suppressed.

TABLE 1

|  |  | Ex. 1 | Ex. 2 | Ex. 3 | Comparative Ex. 1 | Comparative Ex. 2 |
|---|---|---|---|---|---|---|
| Front-Side Chamfered Part | Ra [nm] | 230 | 230 | 170 | 230 | 4 |
| Back-Side Chamfered Part | Ra [nm] | 5 | 9 | 60 | 230 | 4 |
| End Part Impact Resistance | | A | A | A | B | A |
| End Part Display Defect | | A | A | A | A | B |

As apparent from the results shown in the above-described Table 1, in Examples 1 to 3 in which the surface roughness Ra of the front-side chamfered part 13*a* was more than 100 nm and the surface roughness Ra of the back-side chamfered part 13*b* was 100 nm or less, the end part impact resistance was excellent and the end part display defect was suppressed.

In contrast, in Comparative Example 1 in which the surface roughness Ra of the back-side chamfered part 13*b* was not 100 nm or less, the end part impact resistance was insufficient.

In addition, in Comparative Example 2 in which the surface roughness Ra of the front-side chamfered part 13*a* was not more than 100 nm, the suppression of the end part display defect was insufficient.

While the present invention has been explained in detail with reference to specific embodiments, it is apparent to one skilled in the art that various changes and modifications can be made therein without departing from the spirit and scope of the present invention. This application is based on Japanese Patent Application (No. 2016-108748) filed on May 31, 2016, the contents of which are incorporated herein by reference.

DESCRIPTION OF REFERENCE NUMERALS AND SIGNS

12: Cover glass
12c: Back surface of cover glass
12d: Front surface of cover glass
12e: First glass plate
12f: Second glass plate
12g: Intermediate film
13a: Front-side chamfered part
13b: Back-side chamfered part
13c: Side surface part
14: Adhesive layer
18: Antireflection film
100: On-vehicle display device
102: Backlight unit
104: Display panel
106: Housing
107: Housing bottom plate
109: Housing frame
110: Housing end frame
111: Housing protrusion part
115: Double-sided tape
200: Specimen
207: Double-sided tape
208: L-shaped member
215: Support plate
301: Fixing part
311: Bolt
321: Cushioning material
P: Collision position

The invention claimed is:

1. A cover glass for covering a display panel of a display device, comprising:
   a front surface not to be faced, to the display panel;
   a back surface to be faced to the display panel;
   a front-side chamfered part which is a chamfered part on the side of the front surface;
   a back-side chamfered part which is a chamfered part on the side of the back surface; and
   an antireflection on/above the front surface,
   wherein the front-side chamfered part has a surface roughness Ra of more than 100 nm, and the back-side chamfered part has a surface roughness Ra of 100 nm or less.

2. The cover glass according to claim 1, wherein the cover glass is a strengthened glass.

3. The cover glass according to claim 1, wherein the cover glass is a chemically strengthened glass, having a compressive stress layer having a thickness of 10 μm Or more.

4. The cover glass according to claim 1, wherein the cover glass is a chemically strengthened glass, having a compressive stress layer having a surface compressive stress of 500 MPa or more.

5. The cover glass according to claim 1, wherein at least one of the front-side chamfered part and the back-side chamfered part is a C-chamfered part.

6. The cover glass according to claim 1, having a plate thickness of 0.5 to 2.5 mm.

7. The cover glass according to claim 1, wherein the front surface or the back surface has a size of from 100 to 900 mm in a longitudinal direction and from 40 to 500 mm in a transverse direction.

8. The cover glass according to claim 1, wherein the front-side chamfered part has a surface roughness Ra of 140 nm or more.

9. The cover glass according to claim 1, wherein the front-side chamfered part has a surface roughness Ra of 500 nm or less.

10. The cover glass according to claim 1, wherein the back-side chamfered part has a surface roughness Ra of 70 nm or less.

11. The cover glass according to claim 1, wherein the back-side chamfered part has a surface roughness Ra of 0.1 nm or more.

12. Tire cover glass according to claim 1,
    wherein the cover glass is a laminated glass in which a first glass plate constituting the front surface and a second glass plate constituting the back surface are bonded to each other,
    the front-side chamfered part is a chamfered part on the side of the front surface of the first glass plate, and
    the back-side chamfered part is a chamfered part on the side of the hack surface of the second glass plate.

13. The cover glass according to claim 1, which is a cover glass of an on-vehicle display device.

14. The cover glass according to claim 13, wherein the on-vehicle display device is an on-vehicle display device for rear sheet.

15. A display device comprising the cover glass according to claim 1.

16. The display device according to claim 15, which is an on-vehicle display device.

17. The display device according to claim 16, wherein the on-vehicle display device is an on-vehicle display device for rear sheet.

18. The cover glass according to claim 1, wherein the front-side chamfered part has a surface roughness Ra of 170 nm or more.

* * * * *